US012294160B2

(12) United States Patent
Arias Correa et al.

(10) Patent No.: US 12,294,160 B2
(45) Date of Patent: May 6, 2025

(54) LIGHT-TUNED ANTENNA DEVICE

(71) Applicant: INSTITUTO TECNOLÓGICO METROPOLITANO, Medellín (CO)

(72) Inventors: Alberto Mauricio Arias Correa, Medellín (CO); Erick Estefen Reyes Vera, Medellín (CO)

(73) Assignee: INSTITUTO TECNOLÓGICO METROPOLITANO, Medellin (CO)

( * ) Notice: Subject to any disclaimer, the term of this patent is extended or adjusted under 35 U.S.C. 154(b) by 130 days.

(21) Appl. No.: 18/259,859

(22) PCT Filed: Dec. 21, 2021

(86) PCT No.: PCT/IB2021/062128
§ 371 (c)(1),
(2) Date: Jun. 29, 2023

(87) PCT Pub. No.: WO2022/144696
PCT Pub. Date: Jul. 7, 2022

(65) Prior Publication Data

US 2024/0088560 A1 Mar. 14, 2024

(30) Foreign Application Priority Data

Dec. 30, 2020 (CO) ........................ NC2020/0016679

(51) Int. Cl.
*H01Q 3/26* (2006.01)
*H01Q 3/44* (2006.01)
(Continued)

(52) U.S. Cl.
CPC .......... *H01Q 5/357* (2015.01); *H01Q 3/2676* (2013.01); *H01Q 3/44* (2013.01); *H01Q 9/0407* (2013.01)

(58) Field of Classification Search
CPC ........ H01Q 3/2676; H01Q 3/44; H01Q 5/307; H01Q 5/357; H01Q 9/0407
See application file for complete search history.

(56) References Cited

U.S. PATENT DOCUMENTS 2,012,028 A 8/1935 Twyman
4,751,513 A 6/1988 Daryoush et al.
(Continued)

*Primary Examiner* — Daniel Munoz
(74) *Attorney, Agent, or Firm* — The Morales Law Firm; Joseph L. Morales, Esq.

(57) ABSTRACT

The present invention relates to a light-tuned antenna device. The light-tuned antenna device comprises a First support element with one or more through-holes, and a photosensitive substrate disposed in one of the through-holes in the first support element, the photosensitive substrate having a first surface and a second surface. In addition, the antenna device comprises one or more patch-type antennas disposed on the first surface of the photosensitive substrate, and a second support element provided with one or more through-holes and disposed distally from the first support element. The device further comprises one or more focusing systems disposed in one of the through-holes in the second support element, and a control unit that Controls the focusing system. The focusing system is formed by one or more light sources that emit a light beam that passes through one or more lenses, wherein the light beam passing through the lens is incident on the second surface of the photosensitive substrate at a focal point, so as to tune the antenna.

10 Claims, 5 Drawing Sheets

(51) Int. Cl.
*H01Q 5/357* (2015.01)
*H01Q 9/04* (2006.01)

(56) References Cited

U.S. PATENT DOCUMENTS

| | | | | |
|---|---|---|---|---|
| 2012/0287002 | A1 | 11/2012 | Parsche | |
| 2016/0036529 | A1* | 2/2016 | Griffith | H01Q 5/22<br>398/116 |
| 2017/0104269 | A1* | 4/2017 | Bowden | H01Q 1/36 |
| 2019/0252785 | A1 | 8/2019 | McMichael | |

* cited by examiner

LIGHT-TUNED ANTENNA DEVICE

TECHNICAL FIELD OF INVENTION

This invention regards to light-tuned antennas, preferably with patch-type antennas with a photosensitive dielectric substrate connected thereto.

DESCRIPTION OF THE STATE OF THE ART

In the state of the art there are several types of antennas tuned by a light beam that use patch-type antennas and/or microstrip patch using optical principles such as those disclosed in patent documents No. US2019252785A1, US20120287002A1 and U.S. Pat. No. 4,751,513.

Document US2019252785A1 refers to a polarization-configurable patch-type antenna that includes a radiant layer, where the antenna is configured to generate a circularly polarized radiation field. Antennas under US2019252785A1 comprise a cut corner that can be configured for the circular polarization of clockwise rotation or anti-clockwise rotation. Additionally, the antenna includes a power supply that capacitively couples the patch without touching the patch itself, allowing the patch to rotate. The antenna has a ground plane, a lower substrate that is stationary to the ground plane and an upper substrate that is rotating in connection to the lower substrate which rotates on a rotation axis. Furthermore, it has a patch-type antennas arranged on the upper substrate. A power supply is arranged on the lower substrate and provides a coupling signal to the patch-type antenna.

On the other hand, patent document US20120287002A1 describes an electronic device that includes a patch-type antenna that has a reduced size, and it is displayed on a display. The device may include a substrate and a stacked arrangement of layers on top thereof, which may include a visual presentation layer and a patch-type antenna on top of the visual presentation layer.

In addition, the patch-type antenna may include an optically transmitting electrically conductive mesh. Specifically, the device comprises an electronic device comprising a housing and a circuit. Moreover, it comprises an input, a screen, and a circuit that includes a power divider and a receiver coupled thereto.

The electronic device includes a patch-type antenna arranged on the substrate; the patch-type antenna has an electrically conductive mesh layer that defines four arched perimeter segments.

Patent document U.S. Pat. No. 2,012,028 also discloses that the shape of the patch-type antenna can be tuned in such a way as to enable a continuous compensation of divergence and curvature that in turn results in the adjustment of the frequency and width of light. In one modality, the electronic device includes a substrate, and a photovoltaic layer on the substrate. A ground plane is above the layer and between the substrate and the patch-type antenna. The ground plane is an optically transmissive mesh.

Finally, patent document U.S. Pat. No. 4,751,513 describes light-controlled antennas which are modified by photosensitive electrical elements connected to radiating elements. The antenna comprises a dielectric plate that has a ground conductive plane fixed at its bottom. On the dielectric plate there are two separate structures and an interconnecting structure. The first structure includes a flat conductive part which is a patch-type antenna along with a power transmission line conductor that acts with the ground conductor to form a power transmission line. The second structure includes an elongated conductor that acts with a ground conductors to form a transmission line. A controllable light source produces light that lights a diode to alter its conduction characteristic (resistance and capacitance) to control the antenna's features.

In the state of the art, there is still the possibility of developing light-tuned patch-type antennas that are easily constructable and accessible.

BRIEF DESCRIPTION OF THE INVENTION

This invention corresponds to a light-tuned antenna device. The light-tuned antenna device comprises a first support element with one or more through-holes, a photosensitive substrate arranged in one of the through-holes of the first support element where the photosensitive substrate has a first and a second surface. Also, the invention considers one or more patch-type antennas arranged on the first surface of the photosensitive substrate and a second support element with one or more through-holes and which is arranged distally to the first support element. In addition, it also includes one or more focusing systems arranged in one of the through-holes of the second support element and a control unit that controls the focusing system.

The focusing system is comprised of one or more light sources that emit a light beam that passes through one or more lenses, wherein the light beam passing through the lens is incident on the second surface of the photosensitive substrate at a focal point, so as to tune the antenna.

DETAILED DESCRIPTION OF THE INVENTION

This invention corresponds to a light-tuned antenna device that enables de tunning of a patch-type antenna in different bandwidths due to the focus of a focusing system on a photosensitive substrate, which will hereinafter be referred to as the "antenna".

Figure 1:
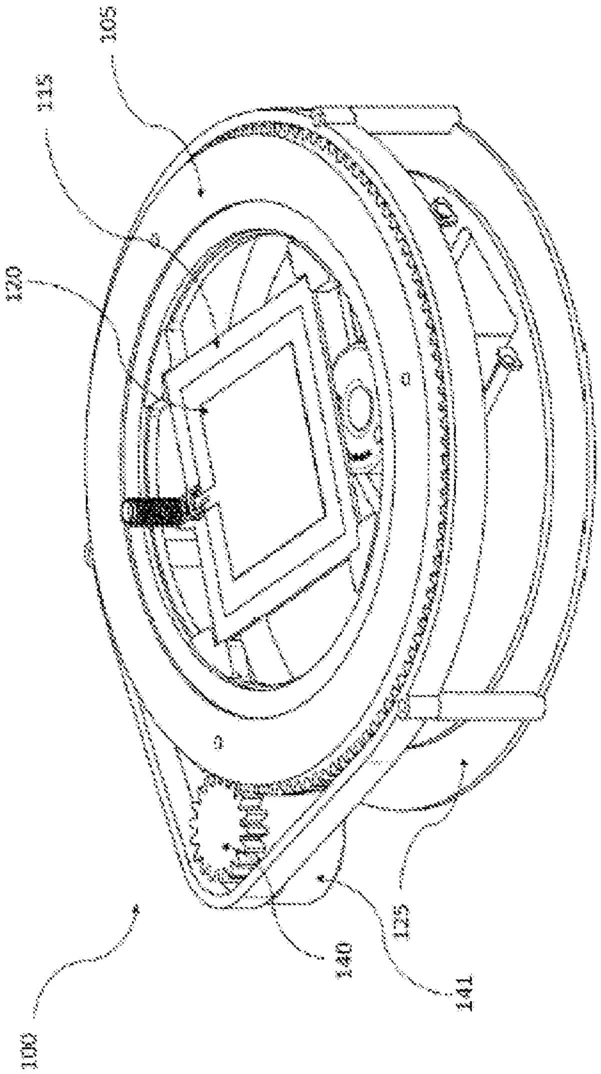
FIG. 1 corresponds to a preferred mode of the antenna device as per the present invention in isometric view.
Figure 2:
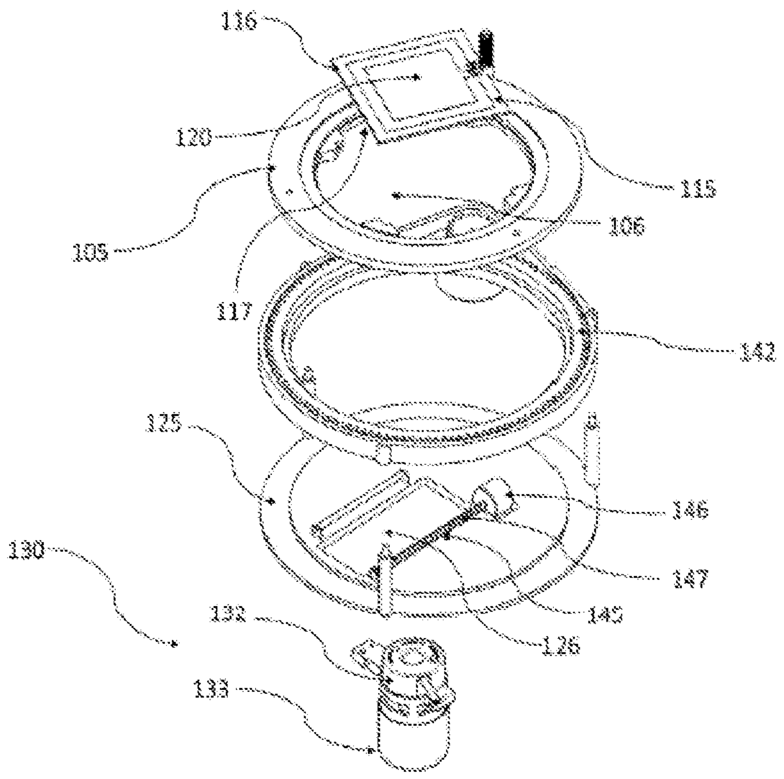
FIG. 2 corresponds to the explosion of the device shown in FIG. 1.

Regarding the antenna, as per the invention and referring to FIG. 1 and FIG. 2, said antenna comprises (100) the following:

- a first support element (105) with one or more through-holes (106);
- one Photosensitive substrate (115) available in one of the through-holes of the first support element, wherein the photosensitive substrate has a first (116) and a second surface (117);
- one or more patch-type antennas (120) arranged on the first surface (116) of the photosensitive substrate (115);

a second support element (125) with one or more through-holes (126) arranged distally to the first support element (105);

one or more focusing systems (130) provided in one of the through-holes (126) of the second support element (125);

A control unit that controls the Focusing System (130); where the Focusing System (130) consists of one or more light sources (133) that emit a light beam passing through one or more lenses (132); and wherein the light beam passing through the lens (132) falls on the second surface (117) of the Photosensitive Substrate (115) at a focal point to tune the antenna (100).

Thus, in the antenna (100) hereunder, the wavelength of the light beam within the focusing system (130) modifies the dielectric permittivity of the photosensitive substrate (115) by changing the antenna's frequency (100).

The antenna (100) described herein, can be advantageously applied in aeronautics, aviation, satellites, missile applications, mobile devices, wireless communications in overall and can be intended for high frequencies in the microwave and millimeter ranges.

This invention assumes that the dielectric permittivity is the capacity of a dielectric material that manages to be affected by an electric field. In the invention, the photosensitive substrate (115) changes dielectric permittivity due to the incident light of the focusing system (130) to a focal point on the second surface (117) of the photosensitive substrate (115).

In an embodiment of the invention, the first support element (105) has a geometric shape selected from circular, oval, rectangular, trapezoidal, regular shapes, irregular shapes and combinations of the above. Preferably, the first support element (105) is circular.

In an embodiment of the invention, the first support element (105) has one or more through-holes (106) where the photosensitive substrate (115) is arranged therein, preferably, the photosensitive substrate (115) is located on the same axial axis as the first support element (105).

The through-hole (106) of the first fastening element (105) has a geometry selected from square, circular, oval, elliptical or any of the above combinations. Preferably, the through-hole (106) has a circular geometry so that the photosensitive substrate (115) can be adjusted with the internal perimeter of the through-hole (106).

A patch-type antenna (120) is connected on the first surface (116) of the photosensitive substrate (115) located on the same axial axis as the first support element (105) and the photosensitive substrate (115). Referring to FIG. 2, the patch-type antenna (120) has a smaller dimension than the photosensitive substrate (115).

This invention assumes that a patch-type antenna is an antenna whose geometry comes from a microstrip line and consists of at least three components such as: a plane of lower mass, a substrate above said plane of mass and a radiating element that is located just above said substrate. Additionally, this invention shall assume in the invention that a microstrip is a type of electrical transmission line which can be manufactured using a printed circuit board.

In a modality of the invention and as per FIG. 1 and FIG. 2, at least one patch-type antenna (120) is available on the first surface (116) of a photosensitive substrate (115). In a modality of the invention that has not been depicted herein, an arrangement of patch-type antennas (120) may be set up on the first surface (116) of the photosensitive substrate (115).

This invention assumes that an array of patch-type antennas (120) arranged in a photosensitive substrate (115) means that two or more patch-type antennas (120) can be arranged on the first surface (116) of the photosensitive substrate (120).

On the other hand, the photosensitive substrate (115) together with the patch-type antenna (120) move rotationally with respect to the same axial axis shared with the first support element (105) through a first transmission mechanism (140). The support element (105) is connected to a crown-type gear, so both the Support element and the Photosensitive Substrate (115) rotate cooperatively and in the same direction.

In one embodiment of the invention, the second support element (125) has one or more through-holes (126). The second support element (125) and through-hole (126) are arranged distally to the first support element (105). Furthermore, they are located on the same axial line, which enables them to share the same axis of rotation.

This invention shall assume that distal means that the second support element (125) is farther from the center of the device than the first support element (105).

In an embodiment of the invention, the second support element (125) has a geometric shape selected from circular, oval, rectangular, trapezoidal, regular shapes, irregular shapes and combinations of the above. Preferably, the second support element (125) is circular.

The through-hole (126) of the second support element (125) has a geometry selected from square, circular, oval, elliptical, or any of the foregoing combinations. Preferably, the through-hole (125) has a rectangular geometry for the purpose of arranging one or more focusing systems (130).

Regarding FIG. 2, the Focusing System (130) is comprised by one or more light sources (133) emitted by a light beam passing through one or more lenses (132). The beam passing through the lens (132) acts upon the second surface (117) of the photosensitive substrate (115) at a focal point to tune the antenna (100).

This invention assumes that a light beam refers to the lines forming a light beam, said light beam is a set of rays that share one same origin and whose spreading takes place without dispersion.

On the other hand, the light source (133) is axially aligned with the lens (132). Moreover, said focusing system (130) moves linearly on the through-hole (126) of the second support element (125) by means of a second transmission mechanism (145).

Also, the focusing system (130) is connected to a second transmission mechanism (145) that enables linear movements regarding the through-hole (126) of the second support element (125).

In an embodiment the invention which has not been depicted herein, the focusing system (130) comprises an actuator that enables the light source (133) to move in linear movements, specifically, these linear movements are perpendicular to the second support element (125). The actuator enables the diameter of the light beam of the light source (133) to have a larger or smaller diameter, and it is focused with the lens (132), thus achieving a wide variety of incident light beam diameters on the second surface (117) of the Photosensitive Substrate (115).

In an embodiment of the invention, the first transmission mechanism (140) and the second transmission mechanism (145) are power transmission elements that are selected from cables, drive chains, belts or drive belts, pulleys, toothed pulleys, gears, pinions, pinion-chain, pinion mechanism and worm screw, rack mechanism, friction wheels, friction discs, ribbed shafts and drawers, cardan joints and homokinetic joints, camshafts and other equivalent mechanical transmission elements known to a person skilled in the field.

Preferably and referring to FIG. 1 and FIG. 2, the first transmission mechanism (140) is a single-stage gear reducer with straight-tooth pinion and crown (142) and, the second transmission mechanism (145) is a worm screw (147).

The single-step reducer of the first transmission mechanism (140) and the worm of the second transmission mechanism (145) move through an electric motor. This electric motor is selected from alternating current motors (e.g., three-phase synchronous motors, synchronized asynchronous motors, motors with permanent magnet rotor, single-phase motors, two-phase motors, motors with auxiliary winding start, motors with winding start and capacitor), direct current motors (e.g., series coupling motors, parallel coupling motors, compound coupling motors), stepper motors (e.g., with encoder, with motor brake, with heat sinks, with inertial dampers, with one, two, or three-stage planetary gear reducers), NEMA 8, NEMA 14, NEMA 11, NEMA 17, NEMA 23, or NEMA 34 stepper motors, equivalent electric motors known to a person moderately savvy in the subject, or combinations thereof. Preferably the first transmission mechanism (140) is connected to a NEMA Class 14 stepper motor (141) and the second transmission mechanism (145) is connected to a NEMA Class 8 stepper motor (146).

In an embodiment of the invention which has not been depicted herein, the control unit controls the focusing system (130), the first transmission mechanism (140) and the second transmission mechanism (145). Moreover, the control unit is also a graphical interface where a user can change the frequency of the antenna (100) by means of the linear speed of the second transmission mechanism (145) and the focusing system (130), as well as the angular speed of the first transmission mechanism (140), the photosensitive substrate (115) and the patch-type antenna (120).

In one embodiment of the invention, the control unit is a device that processes data, for example, microcontrollers, microprocessors, DSCs (Digital Signal Controller, FPGAs (Field Programmable Gate Array after its acronym in English), CPLDs (Complex Programmable Logic Device after its acronym in English), ASICs (Application Specific Integrated Circuit), SoCs (System on Chip), PSoCs (Programmable System on Chip), computers, servers, tablets, cell phones, Smartphones, signal generators and control units known to a person moderately savvy in the matter and combinations thereof.

The radiation emitted by the focusing system (130) due to the angular velocity of the first transmission mechanism (140) and the speed of the second transmission mechanism (145) enables the antenna (100) to operate in different bandwidths, i.e., at the moment a given user sends the instruction for the antenna (100) to operate at a certain frequency, the Focusing System (130) is activated and the transmission mechanisms begin to move (140, 145) in order for the light beam emitted from the light source (133) to focus on part or all of the second surface (117) of the Photosensitive Substrate (115).

The displacement generated by the second transmission mechanism (145) to the focusing system (130) and the rotation generated by the first transmission mechanism (140) enable the user to control the point of incidence of the light beam on the second surface (117) of the photosensitive substrate (115) and the patch-type antenna (120) in cylindrical coordinates.

In one embodiment of the invention, the wavelength generated by the incident light beam from the light source (133), modifies the dielectric permittivity of the Photosensitive Substrate (115) by changing the antenna frequency. That is, depending on the user's instructions in the control unit, the light beam emitted by the light source (133) modifies the permittivity of the photosensitive substrate (115).

In one embodiment of the invention, the second surface (117) of the photosensitive substrate (115) is located on the first support element (105) and in the opposite direction to the focusing system (130).

Figure 3:
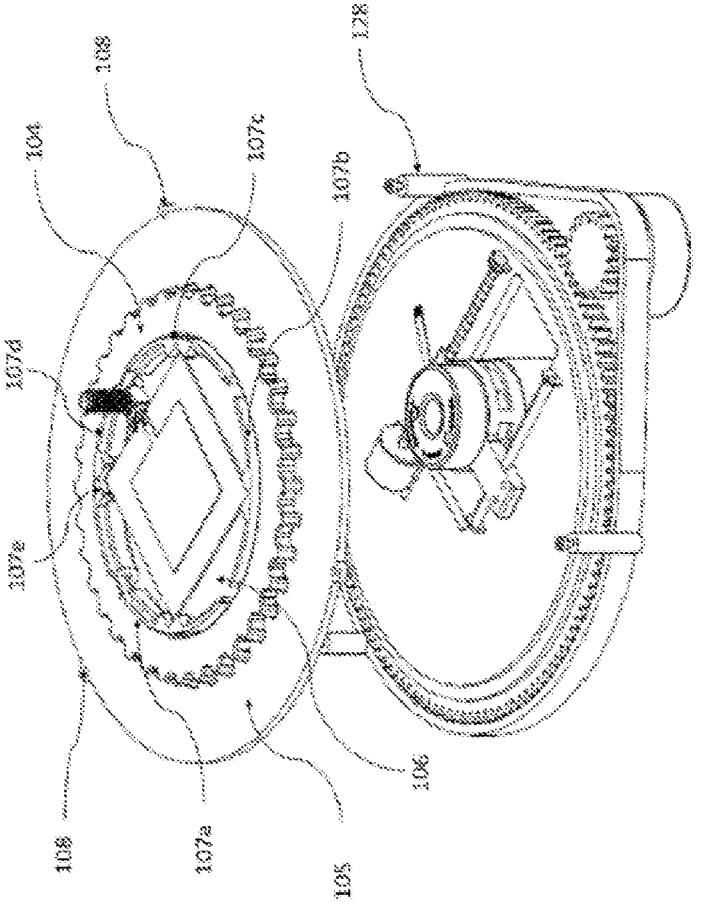
FIG. 3 corresponds to a second preferred modality of the antenna under the present invention in isometric view and in device explosion, showing both transmission systems in the second support element.
Figure 4:
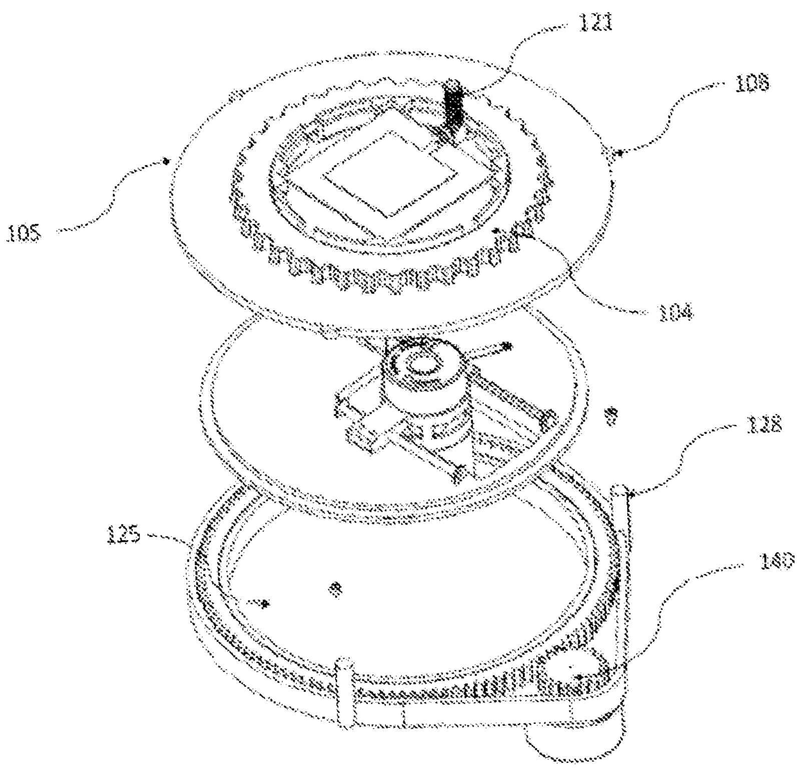
FIG. 4 corresponds to an explosion of the second mode of the antenna device under this invention showing the different components.

In one embodiment of the invention and referring to FIG. 3 and FIG. 4, the first support element (105) comprises at least three through-holes (108) located on the periphery and tangent of the first support element (105). These through-holes (108) are distributed every 120 degrees. Also, the second support element (125) comprises at least three hollow protrusions (128) which have an internal thread. Additionally, these hollow protrusions (128) are located on the periphery and tangent to the second support element (125). These hollow protuberances (128) are distributed every 128 degrees.

The three through-holes (108) of the first support element (105) and the hollow protrusions (128) are connected to each other by fasteners forming a monolithic body.

Referring to FIG. 3, the first support element (105) comprises a through-hole (106), wherein said through-hole (106) describes a male-type threaded neck segmented into four parts (107*a*, 107*b*, 107*c* and 107*d*), where each segment forms a clamp (107*e*).

Regarding FIG. 4., on the neck of the through-hole (106) there is a gripping washer (104) with an internal thread that attaches and rotates on the male thread of the neck of the first support element (105) to adjust the four segments (107*a*, 107*b*, 107*c* and 107*d*).

Referring to FIG. 3 and FIG. 4., before adjusting the four segments, the Photosensitive Substrate (115) must be arranged with the patch-type antenna (120) on the clamps (107*e*). After this, the washer adjusts to the size of the patch-type antenna.

Referring to FIG. 4, a connector (121) is available in contact with the patch-type antenna (120) and with the first surface (116) of the Photosensitive Substrate (115). In one embodiment of the invention, the connector can be an SMA (subminiature version A) type connector.

In a modality of the invention and referring to the FIG. 4, the patch-type antenna (120) is available on the photosensitive substrate (115), in addition, the photosensitive substrate (115) is arranged on the clamps (107*e*).

Figure 5:
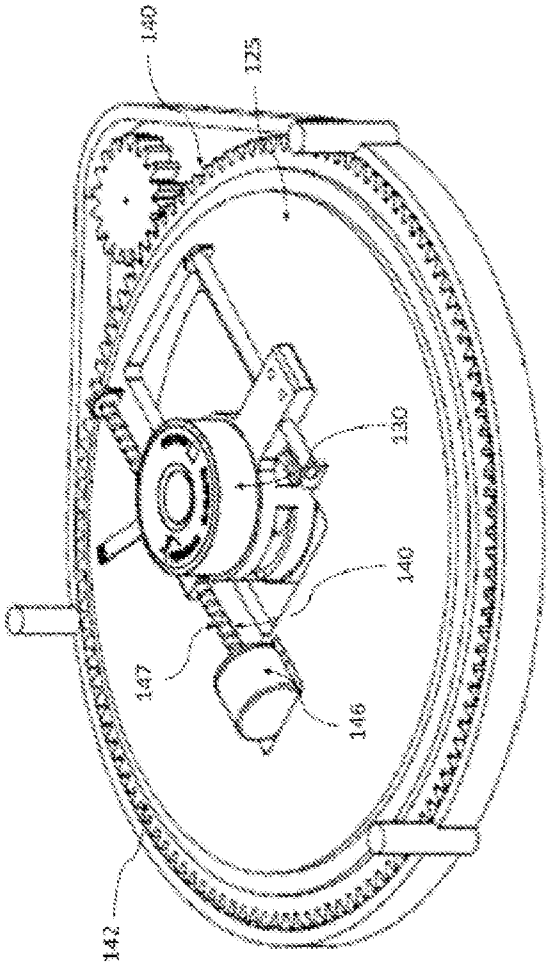
FIG. 5 corresponds to a detailed view of the transmission mechanisms of the second modality as per FIG. 3 and FIG. 4.

Referring to FIG. 5, the second support element (125) connects to the first transmission mechanism (140) and the second transmission mechanism (145). The first transmission element (140) enables the rotational movement of the second support element (125) by means of a first motor (141) and a reducer of a step with straight-tooth pinion and crown (142). The second transmission mechanism (140) enables the linear movement of the focusing system (130) by means of a motor (146) and a worm screw (147).

The displacement generated by the second transmission mechanism (145) to the focusing system (130) and the rotation generated by the first transmission mechanism (140) to the first support element (105), enable the user to control the point of incidence of the light beam on the second surface (117) of the photosensitive substrate (115) and the patch-type antenna (120) in cylindrical coordinates.

The wavelength generated by the light source (130), modifies the permittivity of the photosensitive substrate (115) by changing the frequency of the antenna. That is, depending on the user's instructions in the control unit, the light beam emitted by the light source (133) modifies the permittivity of the photosensitive substrate (115).

It should be worth noting that the present invention is not limited to the modalities described and illustrated herein, and it is not limited to antenna devices tuned by light either, because, as any person savvy in the art knows, there are possible variations and modifications that are not foreign to the spirit of the invention, which is defined by the following claims.

The invention claimed is:

1. A light-tuned antenna device comprising:

a first support element with one or more through-holes;

a photosensitive substrate arranged in one of the through-holes of the first support element, wherein the photosensitive substrate has a first and a second surface;

one or more patch-type antennas arranged on the first surface of the photosensitive substrate;

a second support element with one or more through-holes which is arranged distally to the first support element;

one or more focusing systems arranged in one of the through-holes of the second support element;

a control unit that controls the one or more focusing systems; wherein the one or more focusing systems comprise one or more light sources that emit a light beam that goes through one or more lenses; and where the light beam passing through the one or more lenses falls on the second surface of the photosensitive substrate at a focal point to tune the antenna.

2. The antenna device of claim 1, further comprising a first transmission mechanism connected to the first support element and a second transmission mechanism connected to the focusing system.

3. The antenna device of claim 2, wherein the control unit also controls the first transmission mechanism and the second transmission mechanism.

4. The antenna device of claim 2, wherein the first transmission mechanism enables rotational movements of the photosensitive substrate, and the second transmission mechanism enables linear movements of the focusing system with respect to one or more through-holes of the second support element.

5. The antenna device of claim 2, wherein the first transmission mechanism has an angular velocity, and the second transmission mechanism has a linear velocity.

6. The antenna device of claim 1, wherein the antenna operates in different frequency band widths under the radiation of the light source, the speed of the first transmission mechanism, the speed of the second transmission mechanism and the setting of the focusing system.

7. The antenna device of claim 1, wherein the light beam of the light source lights part or all of the second surface of the photosensitive substrate.

8. The antenna device of claim 2, wherein the displacement generated by the second transmission mechanism to the focusing system and the rotation generated by the first transmission mechanism, enable the user to control the point of incidence of the light beam on the second surface of the photosensitive substrate and the patch-type antenna in cylindrical coordinates.

9. The antenna device of claim 1, wherein the wavelength of an incident light beam modifies the permittivity of the photosensitive substrate by changing the antenna's frequency.

10. The antenna device of claim 1, wherein the second surface of the photosensitive substrate is located on the first support element and in the opposite direction to the one or more focusing system.

* * * * *